Aug. 15, 1967  D. W. CAYTON  3,336,049
IMPLEMENT WITH TAIL WHEEL LIFT ASSIST
Filed Oct. 20, 1965
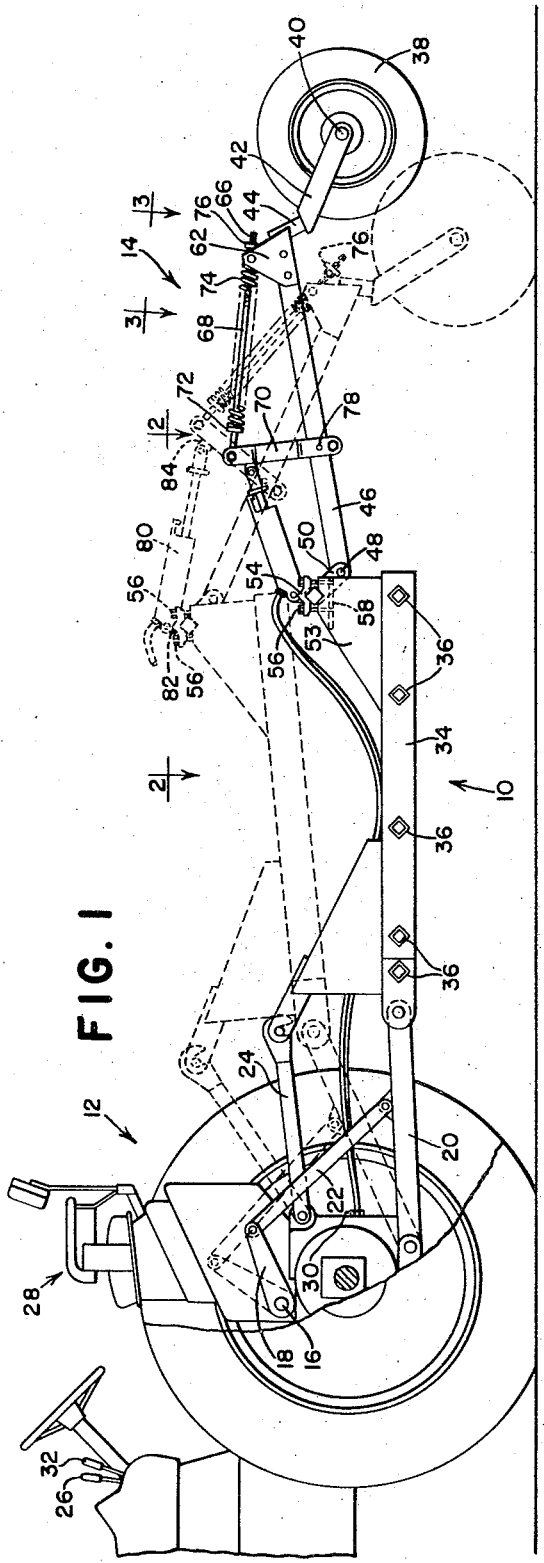
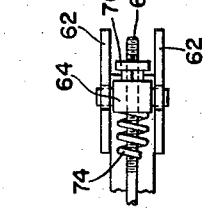
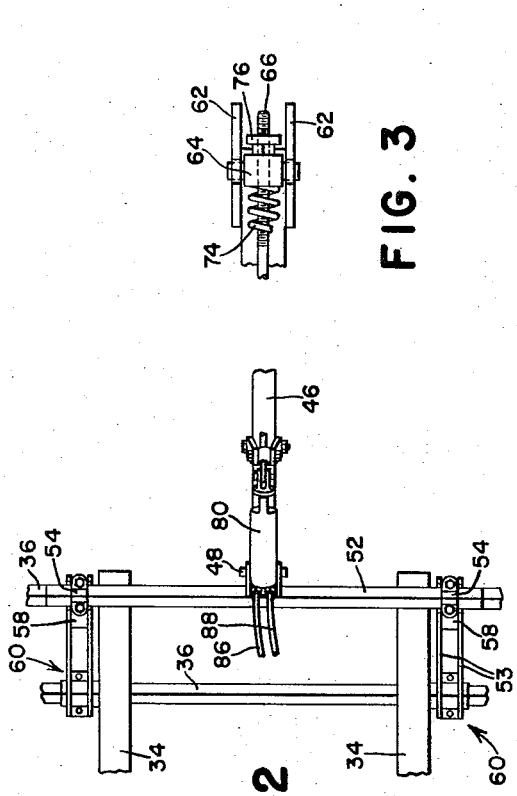
INVENTOR.
DAVID W. CAYTON
BY
*John C. Thompson*
ATTORNEY

United States Patent Office 3,336,049
Patented Aug. 15, 1967

3,336,049
IMPLEMENT WITH TAIL WHEEL LIFT ASSIST
David W. Cayton, Whittier, Calif., assignor to Deere & Company, Moline, Ill., a corporation of Delaware
Filed Oct. 20, 1965, Ser. No. 498,908
3 Claims. (Cl. 280—414.5)

ABSTRACT OF THE DISCLOSURE

An implement for use with a tractor having a three-point hitch, the implement being provided with a hydraulically actuated tail wheel for assisting in lifting the rear end of the implement.

---

The present invention relates generally to agricultural equipment and more particularly to implement carriers with a tail wheel lift assist which are adapted to be secured to conventional farm tractors having a three-point hitch linkage.

In recent years the horsepower of farm tractors has been increasing at a rapid rate whereby today many of the larger tractors can propel forwardly more equipment than they can lift. Thus the typical 80-90 horsepower tractor of today does not have sufficient stability or weight on its forward wheels to lift as such as it can pull.

Therefore it is an object of this invention to provide an implement carrier having an improved tail wheel lift assist whereby the conventional farm tractor to which the implement is secured may lift an implement of greater weight than it could without the tail wheel lift assist.

More particularly it is an object of this invention to provide a tail wheel lift assist in which a hydraulic cylinder acts through a spring linkage whereby the full force of the cylinder can be applied through the linkage but because of the spring arrangement only a regulated amount of this force is applied to the implement carrier being lifted.

A still further object of this invention is to provide a tail wheel lift assist having spring means to absorb shock during transport.

A still further object of this invention is to provide a tail wheel lift assist for an implement carrier in which the tail wheel can be lifted completely off the ground when not in use.

A still further object of this invention is to provide a tail wheel lift assist which can be clamped on an implement carrier in an infinite number of locations thereby eliminating blind spots.

Another object of this invention is to provide a tail wheel lift assist for an implement carrier which is reliable in operation, easy to assemble, and relatively low in cost.

These and other objects and advantages of this invention will be apparent to those skilled in the art after a consideration of the following detailed description, taken in conjunction with the accompanying drawings in which the preferred form of this invention is illustrated.

FIG. 1 is a side view of the implement carrier and tail wheel lift assist of this invention shown associated with a conventional farm tractor having a three-point linkage system, the full lines showing the implement carrier and tail wheel lift assist in the normal ground-working position, and the broken lines showing the implement carrier and tail wheel lift assist in their transport position.

FIG. 2 is a top view taken along the lines 2—2 in FIG. 1.

FIG. 3 is an enlarged top view taken along the lines 3—3 in FIG. 1.

Referring first to FIG. 1 the implement carrier, indicated generally at 10, is shown associated with a conventional farm tractor, indicated generally at 12, the carrier being provided with a tail wheel lift assist, indicated generally at 14. The tractor, as is conventional, has a rockshaft 16 which carries rock arms 18, each of the rock arms being interconnected with a rearwardly extending draft link 20 through a lift link 22. The tractor is also provided with an upper compression link 24, the draft links 20 and compression link 24 forming the three-point linkage with which most farm tractors of today are provided. The three-point linkage can be caused to be raised and lowered by means of a conventional hydraulic system (not material to the present invention) which can be controlled by means of a lever 26 which is convenient to the tractor seat 28. The tractor is also provided with a source of hydraulic fluid under pressure which is interconnectible with remotely operated hydraulic devices by means of an outlet fitting 30, the hydraulic fluid being controlled through means of lever 32.

The implement carrier 10 illustrated in the drawings includes a plurality of longitudinally extending frame members 34 which are interconnected by transversely extending tool bars 36. Various ground-working devices can be secured to the tool bars, as for example corrugators, tillers, cultivator shanks, etc. The implement carrier 10 is secured to the tractor three-point linkage in a conventional manner and it should be obvious that as the three-point linkage is caused to be raised from the full-line position to the broken-line position through actuation of the lever 26 that the implement carrier will be swung upwardly to the dotted-line position in FIG. 1.

To provide for increased tractor stability the tail wheel lift assist 14 is provided whereby part of the weight of the implement carrier is supported by a ground-engaging wheel 38 when the implement carrier is in the transport position. The wheel 38 is rotatably carried on an axle 40 by a bifurcated yoke portion 42 which carries at its upper forward end a generally vertically extending shaft (not illustrated) which is rotatably disposed within a sleeve 44. The sleeve 44 is rigidly secured to an arm 46, the forward end of the arm 46 being swingably carried on transversely extending pin means 48, the outer ends of the pin 48 being received within apertures of downwardly extending links 50 that are rigidly secured at their forward upper ends to a transversely extending tool bar 52. The tool bar 52 is in turn secured at either end to vertically extending members 53 by means of clamping plates 54 which are secured to the members 53 by means of nut and bolt means 56 which are received by a transversely disposed plate 58 which interconnects adjacent vertically disposed members 53 as can best be seen in FIG. 2. Each pair of plates 53 is secured to the transversely extending tool bars 36 by forward and rear clamping structures, the forward clamping structures being indicated generally at 60 in FIG. 2.

Rigidly secured to the rear end of arm 46 on either side are spaced apart plates 62 which are apertured in their upper ends and receive within the aligned apertures a trunnion abutment 64. The trunnion 64 is apertured and receives within the aperture the rearward threaded end 66 of an elongated rod 68, the forward end of which is pivotally interconnected to an upwardly extending link 70. The rod 68 is provided with a first collar 72 adjustable about its forward end by means of a set screw, and a spring 74 is disposed between the first collar 72 and the trunnion abutment 64. A second adjustable collar 76 is threaded about the rear end of the rod 66. The link 70 is bifurcated at its lower end and is secured pivotally to the arm 46 by means of a pin 78. An extensible and retractable hydraulic cylinder 80 is mounted at its forward end to an upwardly extending lug 82 that is rigidly secured to the transversely extending tool bar 52, the rearward end of the cylinder 80 being pivotally interconnected with a forwardly extending lug 84 carried by the link 70. The cylinder 80 is interconnected with the fittings 30 by means of hydraulic fluid lines 86, 88.

The operation of the tail wheel lift assist is as follows: In order to raise the implement carrier from the full-line position shown in FIG. 1 to the dotted-line position the cylinder 80 is extended and the spring 74 is compressed (storing the energy from the cylinder). This puts an upward force on the rear of the implement 10 but does not cause it to move. Then the three-point hitch is operated through lever 26 and it has to add only enough additional force to move the implement up. The amount of vertical force applied through the tail wheel can be regulated by adjusting the first collar 72. The ground clearance of wheel 38 when not in use is regulated by adjusting the second pushrod collar 76.

During transport the coil spring will absorb shocks, and the square bar will also act as a torsion bar to absorb shocks.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. In combination with a tractor having a conventional three-point hitch to which implements may be secured for raising and lowering and a hydraulic fluid control means for causing a remote hydraulic cylinder to be extended or retracted, an implement carrier having: a frame secured at its forward end to the tractor three-point hitch, an arm secured at its forward end to the rear of the frame for swinging movement about a transversely extending axis and carrying on its rear end a ground-engaging wheel, an extensible and retractable hydraulic cylinder pivotally secured at one end to said frame at a point spaced away from the transversely extending axis about which the arm swings, resilient means interconnecting the other end of the cylinder with a portion of the arm remote from its point of swinging connection, and means interconnecting said cylinder with said fluid control means on the tractor whereby the implement carrier can be raised from its ground-working position to a transport position by first extending the cylinder to store energy within the resilient means without attendant movement in the rear end of the carrier, and subsequently raising the three-point hitch to cause the front and rear ends of the implement carrier to be raised.

2. The combination set forth in claim 1 in which the frame includes transversely extending tool bar means to which earth-engaging tools may be selectively secured, the securing means comprises a pair of spaced apart substantially vertically disposed members, means securing the lower portions of the vertical members to spaced apart portions of the tool bar means, a transversely extending member carried by and interconnecting the upper portion of the vertical members, a downwardly extending link secured at its upper end to an intermediate portion of the transverse member, and pivot means interconnecting the lower end of the downwardly extending link with the other end of the arm.

3. The combination set forth in claim 1 in which the resilient means includes a rod threaded at one end, first and second abutment means normally disposed at opposite ends of the rod, one of said abutments being normally fixed relative to the other end of the rod and the other of said abutment means being apertured and normally receiving the threaded end of the rod, means interconnecting the apertured abutment means with the arm, means pivotally interconnecting the other end of the rod with the hydraulic cylinder, compression spring means disposed about the rod and in engagement with said abutments, and collar means disposed about the rod and adjustable whereby the preload may be varied.

References Cited

UNITED STATES PATENTS

| | | | |
|---|---|---|---|
| 2,968,356 | 1/1961 | Mydels | 172—491 X |
| 3,082,830 | 3/1963 | McKay | 172—328 |
| 3,111,174 | 11/1963 | Fry et al. | 172—316 X |
| 3,207,233 | 9/1965 | Shumaker | 172—316 |

LEO FRIAGLIA, *Primary Examiner.*